United States Patent
Starr et al.

(10) Patent No.: US 8,457,778 B2
(45) Date of Patent: Jun. 4, 2013

(54) ROBOTIC STORAGE LIBRARY WITH QUEUED MOVE INSTRUCTIONS AND METHOD OF QUEUING SUCH INSTRUCTIONS

(75) Inventors: Matthew Thomas Starr, Lafayette, CO (US); Michael Gerard Goberis, Broomfield, CO (US)

(73) Assignee: Spectra Logic Corp., Boulder, CO (US)

( * ) Notice: Subject to any disclaimer, the term of this patent is extended or adjusted under 35 U.S.C. 154(b) by 1038 days.

(21) Appl. No.: 12/192,695

(22) Filed: Aug. 15, 2008

(65) Prior Publication Data
US 2010/0042247 A1 Feb. 18, 2010

(51) Int. Cl.
*B65G 1/00* (2006.01)

(52) U.S. Cl.
USPC ............... 700/214; 710/24; 710/5; 710/52

(58) Field of Classification Search
USPC .... 700/214, 218, 247–248; 198/347.1–347.4; 414/266–329, 807–808, 331.01–332
See application file for complete search history.

(56) References Cited

U.S. PATENT DOCUMENTS

| | | | | |
|---|---|---|---|---|
| 4,458,316 A * | 7/1984 | Fry et al. | | 710/52 |
| 5,388,016 A * | 2/1995 | Kanai et al. | | 360/72.1 |
| 5,418,971 A * | 5/1995 | Carlson | | 710/24 |
| 5,623,693 A * | 4/1997 | Ashton et al. | | 710/5 |
| 5,654,839 A * | 8/1997 | Tanaka et al. | | 360/71 |
| 5,768,141 A * | 6/1998 | Hanaoka et al. | | 700/214 |
| 5,818,723 A | 10/1998 | Dimitri | | |
| 6,038,490 A * | 3/2000 | Dimitri et al. | | 700/214 |
| 6,044,442 A * | 3/2000 | Jesionowski | | 711/153 |
| 6,052,341 A * | 4/2000 | Bingham et al. | | 711/112 |
| 6,304,524 B1 | 10/2001 | Gallo et al. | | |
| 6,338,006 B1 * | 1/2002 | Jesionowski et al. | | 700/214 |
| 6,356,801 B1 * | 3/2002 | Goodman et al. | | 700/214 |
| 6,401,011 B1 | 6/2002 | Hashimukai | | |
| 6,480,905 B1 * | 11/2002 | Jesionowski et al. | | 710/8 |
| 6,570,734 B2 | 5/2003 | Ostwald et al. | | |
| 6,640,258 B2 * | 10/2003 | Espeseth et al. | | 710/5 |
| 6,671,580 B2 | 12/2003 | Campbell et al. | | |
| 6,691,001 B2 | 2/2004 | Ostwald et al. | | |
| 6,791,910 B1 * | 9/2004 | James et al. | | 369/30.28 |
| 6,804,580 B1 | 10/2004 | Stoddard | | |
| 7,076,327 B1 | 7/2006 | Desai et al. | | |
| 7,131,025 B2 | 10/2006 | Tarcea et al. | | |
| 7,211,980 B1 | 5/2007 | Bruemmer et al. | | |
| 7,251,606 B2 | 7/2007 | Horinaka et al. | | |
| 7,263,596 B1 | 8/2007 | Wideman et al. | | |
| 7,308,529 B1 | 12/2007 | Desai | | |
| 7,370,173 B2 | 5/2008 | Justiss et al. | | |
| 7,548,998 B2 * | 6/2009 | Carlson et al. | | 710/58 |
| 2003/0037061 A1 | 2/2003 | Sastri et al. | | |

(Continued)

*Primary Examiner* — Gene Crawford
*Assistant Examiner* — Kyle Logan
(74) *Attorney, Agent, or Firm* — Kenneth Altshuler

(57) ABSTRACT

A robotic tape library which queues two or more move instructions is described. Generally, the robotic system receives a first move instruction which commands a first robot to move a first tape cartridge from a shelf to a first tape drive to be loaded therein. Though the first move has not actually taken place, the library replies to the host computer that the first tape drive has been loaded with the first tape cartridge, at least to an acceptable level of engagement, at which point, the first move instruction is queued. After receiving a second move instruction from the host to move a second tape cartridge from the shelf to a second tape drive, the library reorganizes and physically carries out the move instructions in a preferred order.

27 Claims, 13 Drawing Sheets

U.S. PATENT DOCUMENTS

| | | |
|---|---|---|
| 2003/0043506 A1* | 3/2003 | Iizuka et al. ............... 360/132 |
| 2004/0078508 A1* | 4/2004 | Rivard ............................ 711/4 |
| 2004/0181388 A1 | 9/2004 | Yip et al. |
| 2004/0181731 A1* | 9/2004 | Rajsuman et al. ........... 714/747 |
| 2005/0043852 A1* | 2/2005 | Gallo et al. ................. 700/214 |
| 2005/0057847 A1* | 3/2005 | Armagost et al. ............. 360/92 |
| 2006/0004482 A1* | 1/2006 | Gallo et al. ................. 700/214 |
| 2006/0132964 A1 | 6/2006 | Lau et al. |
| 2007/0288672 A1* | 12/2007 | Asano et al. ................ 710/110 |
| 2008/0114936 A1 | 5/2008 | Desai |

* cited by examiner

200

Instructions received by host

| Instruction | Robot | Storage Element | Drive |
|---|---|---|---|
| 1 | B | D | 4 |
| 2 | A | B | 3 |
| 3 | A | A | 1 |
| 4 | A | C | 2 |
| Pending | | | |

Instructions reorganized in a preferred order

| Instruction | Robot | Storage Element | Drive |
|---|---|---|---|
| 1 | B | D | 4 |
| 2 | A | B | 2* |
| 4* | B* | C | 3* |
| 3* | A | A | 1 |
| Pending | | | |

Instructions reorganized in a preferred order

| Instruction | Robot | Storage Element | Drive |
|---|---|---|---|
| 1 | B | D | 4 |
| 2 | A | B | 3 |
| 4* | B* | C | 2 |
| 3* | A | A | 1 |
| Pending | | | |

Instructions received by host

| Instruction | Robot | Storage Element | Drive |
|---|---|---|---|
| 1 | A | D | 4 |
| 2 | A | B | 3 |
| 3 | A | A | 1 |
| 4 | A | C | 2 |
| Pending | | | |

410 — row 1
412 — row 2
414 — row 3
416 — row 4
418 — Pending

Instructions reorganized in a preferred order

| Instruction | Robot | Storage Element | Drive |
|---|---|---|---|
| 1 | B* | D | 4 |
| 2 | A | B | 2* |
| 4* | B* | C | 3* |
| 3* | A | A | 1 |
| Pending | | | |

452 — row 1
454 — row 2
456 — row 3
458 — row 4
418 — Pending

Instructions received by host

| Instruction | Robot | Storage Element | Drive | Partition |
|---|---|---|---|---|
| 1 | C | D | 4 | 2 |
| 2 | A | B | 3 | 1 |
| 3 | A | A | 1 | 1 |
| 4 | C | C | 4 | 2 |
| Pending | | | | |

Instructions reorganized in a preferred order

| Instruction | Robot | Storage Element | Drive | Partition |
|---|---|---|---|---|
| 1 | C | D | 4 | 2 |
| 2 | A | B | 2* | 1 |
| 4* | B* | C | 3* | 1* |
| 3* | A | A | 1 | 1 |
| Pending | | | | |

Instructions received by host

| Instruction | Storage Element | Drive |
|---|---|---|
| 1 | D | 1 |
| 2 | B | 2 |
| 3 | A | 3 |
| 4 | C | 2 |
| Pending | | |

Instructions reorganized in a preferred order

| Instruction | Storage Element | Drive |
|---|---|---|
| 1 | D | 3* |
| 4* | C | 2 |
| 3 | A | 1* |
| 2* | B | First Available |
| Pending | | |

Instructions received by host

| Instruction | Robot | Storage Element | Drive |
|---|---|---|---|
| 1 | 1st | D | 1 |
| 2 | 2nd | B | 2 |
| 3 | 2nd | A | 3 |
| 4 | 1st | C | 2 |
| Pending | | | |

1102 – Instruction; 1104 – Robot; 1106 – Storage Element; 1108 – Drive
1110, 1112, 1114, 1116, 1118

Instructions reorganized in a preferred order

| Instruction | Robot | Storage Element | Drive |
|---|---|---|---|
| 1 | 1* | D | 3* |
| 4* | 1* | C | 2 |
| 3 | 1* | A | 1* |
| 2* | 1* | B | First Available |
| Pending | | | |

1102 – Instruction; 1104 – Robot; 1106 – Storage Element; 1108 – Drive
1152, 1154, 1156, 1158, 1160

FIG. 11B

ROBOTIC STORAGE LIBRARY WITH QUEUED MOVE INSTRUCTIONS AND METHOD OF QUEUING SUCH INSTRUCTIONS

CROSS-REFERENCE TO RELATED APPLICATIONS

None

BACKGROUND OF THE INVENTION

1. Field of the Invention

The present invention relates generally to queuing move instructions to organize the move instructions in a preferred order for a storage library system.

2. Description of Related Art

Robotic storage library technology has been a staple in digital mass storage for back-up and server applications for many years. From the time of inception, the technology has evolved in increased complexity and capacity to meet the growing data storage needs fueled by a booming computer industry and the age of the internet. Increased speed at which data can be stored and retrieved for a host computer, or client, has inspired libraries with multiple robotic transport units that move tape cartridges from library shelves to multiple drives.

Libraries with multiple robotic transport units and multiple drives generally transport and load tape cartridges in one of a plurality of drives via move instructions and load instructions, respectively, from a host computer. Generally, a host computer issues a "read element status" request to the library in order to determine the identity of all of the robotic transport units and drives within a library. Once the host computer has obtained knowledge of the library's configuration, the host computer is free to issue move instructions and load instructions wherein the move instructions instruct a designated robot transport unit to move a designated tape cartridge to a designated drive and the load instructions instruct the designated tape cartridge to be loaded in the designated drive. The host computer communicates with both the designated robot and designated drive to determine if the move instruction has been carried out and if the designated tape cartridge has been at least inserted and is "becoming ready" in the designated drive. The message "becoming ready" is a communication that the designated drive is no longer empty but contains the designated tape cartridge that is in the process of having its tape medium threaded in the designated drive. The host computer does not necessarily require the tape cartridge to be "fully ready" for storage operations before issuing another move instruction to either the designated robotic transfer unit or another robotic transfer unit within the library. The current methods of carrying out move and load instructions provide improved library efficiency and speed, however, certain unavoidable inefficiencies remain such as waiting for the designated drive to become ready, or operating with serial move and load instructions, just to name some examples.

In an effort to improve move instructions within a library, both methods and apparatuses are disclosed herein. It is to innovations related to this subject matter that the claimed invention is generally directed.

SUMMARY OF THE INVENTION

The present invention relates generally to queuing move instructions to organize the move instructions in a preferred order for a storage library system. The invention overcomes the disadvantages and limitations of the prior art by providing a method and apparatus for reorganizing load instructions received from a host computer to optimize movement of at least one robot in the storage library system.

Embodiments of the present invention can therefore comprise a robotic storage system comprising: a first and a second robot; a first and a second mobile storage element; a shelf system wherein the first and the second mobile storage elements can be disposed; a first and a second drive adapted to be loaded with either of the mobile storage elements in an engaging relationship whereby storage related operation can occur; a queue system containing a first and a second move instruction received from a host wherein the first move instruction includes commands to move the first mobile storage element from the shelf system to the first drive and load the first mobile storage element into the first drive via the first robot and the second load instruction includes commands to move the second mobile storage element from the shelf system to the second drive and load the second mobile storage element into the second drive via the first robot; a communication interface that affirms to the host that the first move instruction is completed via a first move response, that the first drive is engaged at a minimum acceptable level with the first mobile storage element via a first load response, that the second move instruction is completed via a second move response, that the second drive is engaged at the minimum acceptable level with the second mobile storage element via a second load response wherein all of the responses are made prior to actual execution of any of the responses; and an algorithm operatively regulating the queue system to reorganize the first and the second move instructions in the storage system in a preferred order and cause the first and the second robot to physically execute the instructions in the preferred order.

Another embodiment of the present invention can therefore comprise a method for executing instructions in a robotic storage system comprising: providing a first robot and a second robot, a shelf system supporting a first storage element and a second storage element, a first drive and a second drive; receiving a first request from a host to move the first storage element from the shelf system to the first drive and load the first storage element in a cooperating relationship with the first drive via the first robot; responding to the host that the first storage element has been moved to the first drive and that the first storage element is engaged at the minimum acceptable level with the first storage drive; queuing the first request; receiving a second request from the host, after the first request, to move the second storage element from the shelf system to the second drive and load the second storage element in a cooperating relationship with the second drive via the first robot; responding to the host that the second storage element has been moved to the second drive and that the second storage element is engaged at the minimum acceptable level with the second drive; computing a strategy that reorganizes the first and the second requests in a desired order; and carrying out the strategy via the first and the second robots.

Yet another embodiment of the present invention can therefore comprise a robotic storage system comprising: a queue system containing a first move instruction and a second move instruction wherein the first move instruction commands the first robot to move a first mobile storage element from a shelf system to a first drive and load the first mobile storage element into the first drive, and the second move instruction commands the first robot to move a second mobile storage element from the shelf system to a second drive and load the second mobile storage element into the second drive, the second move instruction received by a host after the storage system makes known to the host that the first mobile storage element has been moved to the first drive and that the first mobile storage element is engaged at a minimum acceptable level with the first drive, prior to actually physically completing the first move instruction; a means for reorganizing the first and the second move instructions in the storage system in a preferred order via the queue system and wherein the first robot and the second robot physically carry out the first and the second move instructions based on the preferred order.

Yet another embodiment of the present invention can therefore comprise a robotic storage library capable of: receiving a first move instruction from a host computer directing a first robot to move a first storage element from a shelf to a first drive; in reference to the first move instruction, responding to the host that the first drive is in possession of the first storage element in a minimal acceptable engaged relationship in anticipation of a second move instruction regardless of whether, in actuality, the first drive possesses the first storage element; receiving a second move instruction from the host computer directing a second robot to move a second storage element from the shelf to the first drive; in reference to the second move instruction, responding to the host that the second drive is in possession of the second storage element in a minimal acceptable engaged relationship regardless of whether, in actuality, the second drive possesses the second storage element; queuing the first and the second move instructions; reorganizing the first and the second move instructions in a preferred order; and carrying out the preferred order via the first and the second robots within the robotic storage library.

Yet another embodiment of the present invention can therefore comprise a robotic storage library including: a plurality of mobile storage elements; a plurality of robots; at least one drive adapted to receive one of the mobile storage elements in an at least minimally acceptable operative engagement; a queue system that is adapted to receive a plurality of move instructions, each of the move instructions to move one of the storage elements via only one of the robots to the at least one drive for operative engagement therewith, to initially organize the instructions in an order essentially as chronologically received, and to reorganize the instructions according to a pre-established algorithm that includes at least two of the plurality of robots.

BRIEF DESCRIPTION OF THE DRAWINGS

FIGS. 2A and 2B are tables that illustrate an example of move instructions received and reorganized for a storage system with multiple robots in accordance with an embodiment of the present invention.

FIGS. 4A and 4B are tables that illustrate an example of instructions received and reorganized for a storage system with multiple robots identified as possessing a single robot in accordance with an embodiment of the present invention.

FIGS. 7A and 7B are tables that illustrate an example of instructions received and reorganized for a storage system with a partitioned storage system in accordance with an embodiment of the present invention.

FIGS. 9A and 9B are tables that illustrate an example of instructions received and reorganized for a storage system with a single robot identified as possessing a single robot in accordance with an embodiment of the present invention.

FIGS. 11A and 11B are tables that illustrate an example of instructions received and reorganized for a storage system with a single robot identified as possessing multiple robots in accordance with an embodiment of the present invention.

DETAILED DESCRIPTION

Figure 1:
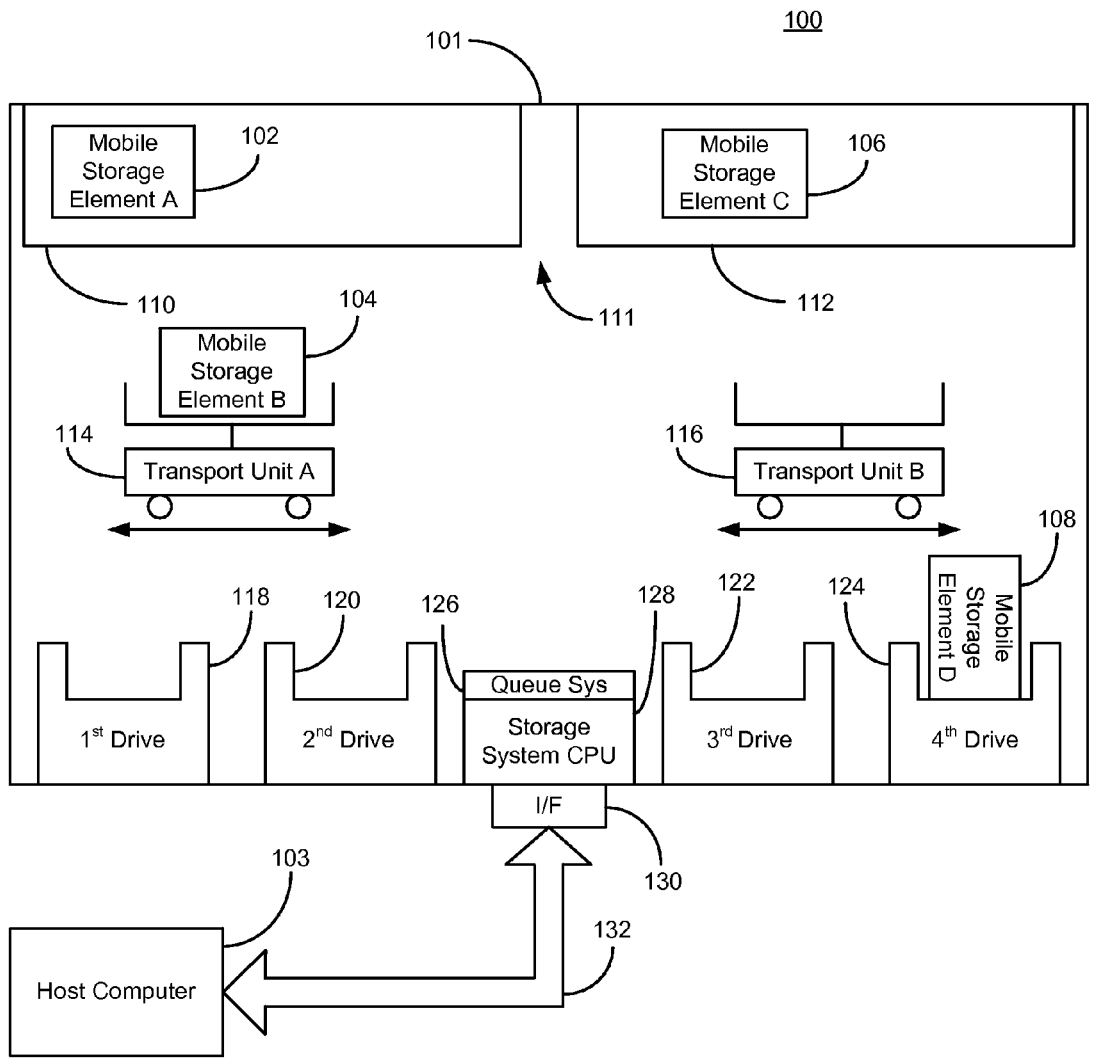
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structures may be identified using identical callouts.

The data storage arrangement 100 includes a host computer 103 in communication 132 with a storage system 101 via a primary communication interface processor device (I/F) 130 that includes a host port (not shown). The host computer 103 is one exemplary embodiment of a consumer of data; other embodiments can also include a second storage system, similar to storage system 101, or a streaming output device such as a video server, just to name some examples. A consumer of data is an entity, or entities, that transmit data or receive data for storage elsewhere, i.e., a consumer of data is generally capable of "taking in" and/or "sending out" data. For example, a host computer 103 is a consumer of data when receiving data (or sending data, such as to the storage system 101), and a storage system 101 is a consumer of data when receiving and sending data to another entity wherein the data is stored. The host computer 103 can be a personal computer, a main frame computer, a server, or any computer system capable of communication with the storage system 101, just to name a few examples. The communication path 132 facilitates communication between the host computer 103 and the storage system 101. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 132 can be in the form of a wire line pathway, wireless, or a combination thereof, for example.

The storage system 101, which may also considered a data storage library by those skilled in the art, is illustratively shown as generally including a shelf system 111, a first robotic transport unit 114 and a second robotic transport unit 116, four mobile storage elements 102, 104, 106 and 108, four drives 118, 120, 122 and 124, a queue system 126, a storage system Central Processing Unit (CPU) 128 and I/F 130. As one skilled in the art will recognize, the block diagram of the storage system 101 shows the primary elements of interest for purposes of simplicity. As such, certain necessary structures and components for the aforementioned elements to properly function are omitted from the detailed description; however, such integrating structures and components do exist within the scope of the present invention. For example, in practice, the storage system 101 includes all of the necessary wiring, user interface panels, plugs, modular components, entry and exit port(s) to introduce (or remove) mobile storage elements into the storage system 101, fault protectors, uninterruptable power supplies, processors, busses, robotic transport unit tracks, indication lights, and so on, in order to function as a data storage library.

As shown in the illustrative embodiment, the shelf system 111 possesses a first shelf 110 and a second shelf 112 wherein the first and second shelf 110 and 112 are adapted to support the mobile storage elements A 102, B 104, C 106 and D 108. The shelf system 111 can possess a single shelf or multiple shelf levels. The shelf system 111 can be located along one side of the storage system 101, as illustratively shown, or optionally in different locations, such as along opposing walls, for example. Furthermore, the shelf system 111 can provide more tailored accommodating locations adapted specifically to one or more mobile storage elements, such as a slot or indentation that matches a mobile storage element's footprint. The mobile storage element is a storage element that has been adapted for repetitive mobility by a robotic transport unit. The mobile storage element can be a disk drive adapted for mobility, a disk drive magazine adapted for mobility, wherein the disk drive magazine comprises a plurality of disk drives, a solid state memory device adapted for mobility, such as a flash memory device, a tape cartridge, a tape magazine comprising a plurality of tape cartridges, an optical disk, a magazine comprising a plurality of optical disks, an independent storage disk, such as a magneto-optical disk or magnetic disk or alternative memory disk used as a storage medium, a magazine comprising a plurality of independent storage disks, or another type of storage device capable of storing data that is adapted for mobility. Hence, a mobile storage element is a storage element that is intended and capable of being moved and engaged with a drive cyclically and frequently. A standard disk drive alone, without modification, for example, is not intended to be repetitively moved within or outside of a library (or computer system) and, hence, is not considered mobile in the spirit of the inventive embodiments used herein unless adapted with a feature or features that facilitate mobility, such as high cycle electrical contacts, for example. A drive herein is a device that is adapted to receive and substantially support a mobile storage element via an opening in the drive such that a read and write relationship is formed (i.e., storage operations are facilitated between the drive and mobile storage medium). Some examples of a drive include, a disc drive docking station, a tape drive, disc drive magazine docking station. A socket adapted to receive a plug, such as a serial port and serial port connector, is not considered to be a docking station, rather, simply a socket.

With continued reference to FIG. 1, the storage system 101 possesses a first robotic transport unit 114 and a second robotic transport unit 116 wherein the first robotic transport unit 114 is illustratively shown transporting magazine B 104 between a drive 118 and the shelf system 112, and a second robotic transport unit 116 that is available for transporting a mobile storage element. The term "robot" may be used, herein, to abbreviate the term "robotic transport unit" without departing from the scope and spirit of the present invention. In one embodiment, the robots 114 and 116 are adapted to move between the first shelf 110 and the second shelf 112 and all of the drives 118, 120, 122 and 124. Though the robots 114 and 116 are illustratively shown as block diagrams, one commercial example of a robotic transport unit can be seen in a commercial example of a storage system, namely, a T-950 library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps mobile storage elements from a shelf system or from a drive to be moved via the associated robotic transport unit. The integrated picker system further is capable of disposing a mobile storage element to the shelf system or to a drive. In the illustrative embodiments, the robot merely provide transportation of the mobile storage elements from a location associated with the shelf system 111 to a drive wherein the robot may provide the added feature of depositing a mobile storage element on the shelf system 112 and/or loading the mobile storage element in a cooperating relationship with a drive such that data can be read to and written from the mobile storage element via the drive. In optional configurations, a loading feature can reside with each drive as opposed to a picker unit integrated with a robotic transport unit.

The storage system 101 illustratively shows four drives 118, 120, 122 and 124, however, in optional embodiments, the library may possess more drives or fewer drives. A drive herein is considered to be a device that forms a cooperating relationship with a mobile storage element such that data can be written to and from the mobile storage element wherein the mobile storage element serves as a mass storage device. A drive herein is not merely a socket device and cable, such as that which is used for connecting a disk drive to a computer system. Examples of various drives used within the scope and spirit of this invention include: a tape drive that is adapted to receive tape cartridges, a disk drive docking station which receives a disk drive adapted for mobility that when paired forms a cooperating read and write relationship, as exemplified in U.S. Application No. 2004/0181388 to Yip et al., a disk drive magazine docking station which receives a mobile disk drive magazine, as exemplified in U.S. Application No. 2006/0132964 to Lau et al, a Compact Disk (CD) drive used with a CD, etc.

In the interest of simplifying the description, the storage system 101 and the components therein will be described in terms of tape library embodiments hereinafter. Hence, a tape library 101 will be used as an embodiment of the storage system 101, tape drives will be used as an embodiment for the drives, and tape cartridges will be used as an embodiment for mobile storage elements. The tape library and tape library component embodiments will share common callouts. Communication protocol is bridged between the host computer 103 and the tape library 101 via the I/F 130. That is, the host computer 103 may communicate over one protocol and the tape library 101 may use a different protocol, hence, the I/F 103 facilitates communication to occur between the tape library 101 and the host computer 103. One commercial example of an I/F system is a Fibre Quad Interface Processor (FQIP) manufactured by Spectra Logic Corporation. The FQIP facilitates communication between a host computer system which uses a fibre protocol and the Spectra Logic storage library which uses a SCSI-like Computer Area Network (CAN) protocol unique to the Spectra Logic Corporation to communicate with the components comprised therein over the library's internal Computer Area Network bus.

With respect to FIG. 1, the I/F 130 is linked to the CPU 128, along with most electrical components within the tape library 101 via a CAN (not shown) specific to the tape library 101. The I/F 130 is illustratively shown in communication via the two way arrow 132 with the host computer 103. Generally, the host computer 103 issues a read element status request used to determine the identity and volume of tape cartridges, the number of tape drives and their respective logical unit numbers, the number of robots, etc. Upon the read element status request, in this embodiment, the primary communications I/F 130 transmits to the host computer 103 that the tape library 101 possesses the elements and components as shown in FIG. 1. One set of commands that the tape library 101 receives from the host computer 103 are instructions to move a tape cartridge and then to load the tape cartridge to a drive. Some tape libraries do not use a load instruction because the associated drives provide "soft loads"; that is, loads that are facilitated by the drive, such as when a tape drive "sucks in" a tape cartridge. The host 103 is generally in communication with both a designated robot and a designated tape drive via the I/F 130.

When the tape library 101 communicates to the host computer 103 that the move is completed, the host 103 will initiate a query to the designated tape drive to determine if the drive is engaged with the tape cartridge at an acceptable level. In the event the move instruction is reported to the host computer 103 as accomplished and yet the tape drive is not reported as at least having an acceptable level of engagement with the tape cartridge, then an error message will occur that indicates the tape drive is unusable, whereupon the tape drive will be taken off-line, or "downed". A "downed" drive will defeat the ability of the tape library 101 from performing storage related operations with the intended tape cartridge, not to mention, a "downed" drive may further result in the robot being taken off-line as well. An minimum acceptable level of engagement is a minimum level at which a tape cartridge and a tape drive have formed a cooperating relationship wherein the tape cartridge and the tape drive are linked but may not be ready to perform storage related operations, however, the minimum state at which the tape cartridge and the tape drive are linked must satisfy the host computer 103 that no immediate problem exists between the tape drive and tape cartridge that would cause the host computer 103 to "down" the tape drive. An acceptable minimal level of engagement between a tape drive and a tape cartridge may vary from the moment the tape cartridge is disposed within the tape drive or after the tape cartridge is fully ready to commence storage related operations (data exchange with the host computer 103), or at some point there between. For example, the host computer 103 may "down" a tape drive if the tape drive registers as empty (Small Computer System Interface (SCSI) status [2,3A,0]); that is, when the tape drive is devoid of any tape cartridge. The host computer 103 may, however, determine that there is acceptable engagement between the tape drive and the tape cartridge if the tape drive registers that it is in the process of becoming ready (SCSI status [2,3,1]); that is, the tape medium inside the tape cartridge 107 is in the process of being threaded in the tape drive. Alternatively, the host computer 103 may determine that there is acceptable engagement between the tape drive and the tape cartridge when the tape cartridge trips a switch within the tape drive during the process of insertion into the tape drive.

In some instances, the host computer 103 may identify the tape library 101 as possessing multiple robots and send multiple move instructions corresponding to each robot, wherein the host computer 103 waits to receive confirmation that each move instruction has been carried out by each robot and that each tape drive associated with the respective move instruction is engaged with the respective tape cartridge at an acceptable level. In one embodiment of the present invention, each move instruction is held in queue and not physically carried out; however, the tape library 101 responds to the host computer 103 that each move instruction has been accomplished, in a virtual sense, and each associated tape drive is, at the least, engaged with a tape cartridge at an acceptable level. In an optional embodiment, each associated tape drive is reported as "ready", however, with a hold on receiving data until further directive from the host computer 103. Either way, the tape library 101 is then free to physically carry out each instruction in a preferred order.

The queue can be a simple table of move instructions that are reorganized in a preferred order by queue system 126 and an associated algorithm. The queue system 126 can be an integrated function within the tape library's Central Processing Unit (CPU) 128 or a standalone device providing sufficient memory to maintain a table of instructions and an ordering algorithm that is executed with the appropriate processors that can receive, manage and perform the queuing duties. The table of instructions can be saved on flash memory, a hard drive, or some other means for maintaining a record of instructions for future use in the event that an unexpected loss of power occurs. In an optional embodiment, the move instructions can be saved and maintained in a format that is not a table, but rather, is streamed data, or optionally, some other means of maintaining the instructions. In any event, the fact that the instructions can be saved in non-volatile memory provides a record of the instructions even after the tape library 101 is re-energized following an unexpected loss of power before the instructions have been fully executed.

FIG. 2A is a queue table 200 that illustratively shows instructions received by the host computer 103. FIGS. 2A and 2B are an example of reorganizing load instructions for the tape library 101 from FIG. 1. Table 200 provides an instruction column 202, a robot transport unit column 204, a storage element column 206, and a drive column 208. The first load instruction 210 received from the host computer 103 instructs robot B 116 to move tape cartridge D 108 from the second shelf 112 to the fourth drive 124 to be loaded therein. As previously discussed, in one embodiment, the tape library 101 transmits to the host computer 103, via the I/F 130, that the first move instruction 210 is accomplished, in a virtual sense, and that the fourth tape drive 124 is engaged to an acceptable level with tape cartridge D 108, in the virtual sense, which, in one embodiment, will facilitate receiving additional move instructions. The first move instruction 210 is not actually carried out, but rather, remains in queue pending any additional move instruction (or instructions). In one embodiment, the first move instruction 210 will remain in queue for a predetermined time whereby the move instruction 210 will be carried out after the predetermined time has expired (such as when no additional move instructions are received from the host computer 103, or if the host computer 103 is endangered of determining that the designated drive, the fourth tape drive 124, is taking too long to come ready and, hence, must be "downed" and needs to be taken off-line, for example). Table 200 further illustratively shows a second move instruction 212 whereby robot A 114 is instructed to move tape cartridge B 104 from the first shelf 110 to be loaded in the third drive 122, a third move instruction 214 whereby robot A 114 is instructed to move tape cartridge A 102 from the second shelf 112 to be loaded in the first drive 118, and a fourth move instruction 216 whereby robot A 114 is instructed to move tape cartridge C 106 from the first shelf 110 to be loaded in the second drive 120. There is a fifth row 218 that is available for any future (pending) move instructions.

In an optional embodiment, the tape library 101 may be configured to receive the second move instruction 212 before responding, in a virtual sense, that first move instruction 210 is accomplished and the fourth tape drive 124 is engaged with tape cartridge D 108 at an acceptable level, because both robot A 114 and robot B 116 have been identified and selected by the host computer 103. Hence, in this situation, the host computer 103 may not require confirmation that the first move is complete and first load underway before sending the additional (second) move instruction 212 because the host computer 103 may be attempting to optimize storage related activities by recruiting both robots 114 and 116.

FIG. 2B illustrates a reorganized table of move instructions 250 that has been adjusted to be physically executed in a preferred order. The asterisk (*) indicates when an instruction or portion of an instruction has been altered from the queue table 200. As illustratively shown in the reorganized table of move instructions 250, the first move instruction 210 was not altered, and, as shown in FIG. 1, has been carried out. The second move instruction 252 has been changed from moving tape cartridge B 104 to the second drive 120 instead of the third drive 122. As can be readily seen from FIG. 1, the second drive 120 resides in a more direct path from the first shelf 110 than does the third drive 122. Assigning the second drive 120 instead of using the third drive 122, as originally designated by the host 103, can be accomplished by changing the drive addresses seen by the host 103 at the I/F 130 or at the CPU 128, or at a like component capable of altering the addresses that are presented to the host 103. Hence, each drive, in this example, does not have a fixed address. The act of organizing move instructions, or move commands, may include reordering a move instruction in entirety or altering portions of a move instruction, as illustratively shown by the asterisk. The fourth move instruction 254 has been reordered to occur before the third instruction 256 in order to facilitate the transport of tape cartridge C 106 while tape cartridge B 104 is being moved (from the second move instruction 252). Reordering the fourth move instruction 254 before the third move instruction 256, results in improved efficiency. Furthermore, the fourth instruction 254 has been reordered to move tape cartridge C 106 from the second shelf 112 with robot B 116 to the third drive 122 which is in a more direct path than the original fourth instruction 216 from FIG. 2A. Finally, the third move instruction 256 has been reordered to be carried out last in order to facilitate the transport of tape cartridge A 102 while tape cartridge C 106 is being moved, which, once again, results in improved efficiency.

As illustratively shown in FIGS. 2A and 2B, a preferred order may be a more direct route of moving a tape cartridge from a shelf 111 to a drive and may more equally share moving operations with the robots. In an optional embodiment, a preferred order may include prioritizing tape cartridges based on critical information or information that is required expeditiously. Alternatively, one robot may be less efficient than another robot, hence the more efficient robot may be recruited more frequently. In yet another embodiment, the queuing order may take into account a malfunctioning drive of the comparative number of drives being serviced by each robot. Alternatively, some move instructions may take precedence according to a customer associated with a particular library partition (a library can be partitioned such that a first partition corresponds to library capacity or resources of a first customer, or first host, and a second partition corresponds to the resources of a second customer, or second host). Alternatively, a preferred order may be a less efficient order of move instructions or parts of move instructions. Examples of these alternative embodiments are conceptually inclusive throughout the applicable embodiments described herein.

FIG. 2C illustrates another embodiment of a reorganized table of move instructions 275 that has been adjusted to be physically executed in a preferred order. The asterisk (*) indicates when an instruction or portion of an instruction has been altered from the queue table 200. In this embodiment, the host 103 designated drives are constrained to be unalterable; that is, the drives (in one embodiment) do not have the benefit of altering address by way of changing addresses as is done in conjunction with the embodiment described in conjunction with FIG. 2B, for example. In an optional embodiment, the drives may be capable of being altered, however, that function may not be enabled. As illustratively shown in the reorganized table of move instructions 275, the first move instruction 210 was not altered, and, as shown in FIG. 1, has been carried out. The second move instruction 212 has not been altered. The fourth move instruction 276 has been reordered to occur before the third instruction 256 using robot B 116 instead of robot A 114 in order to facilitate the transport of tape cartridge C 106 while tape cartridge B 104 is being moved (from the second move instruction 252). Finally, the third move instruction 256 has been reordered to be carried out last in order to facilitate the transport of tape cartridge A 102 while tape cartridge C 106 is being moved, which, once again, results in improved efficiency.

Figure 3:
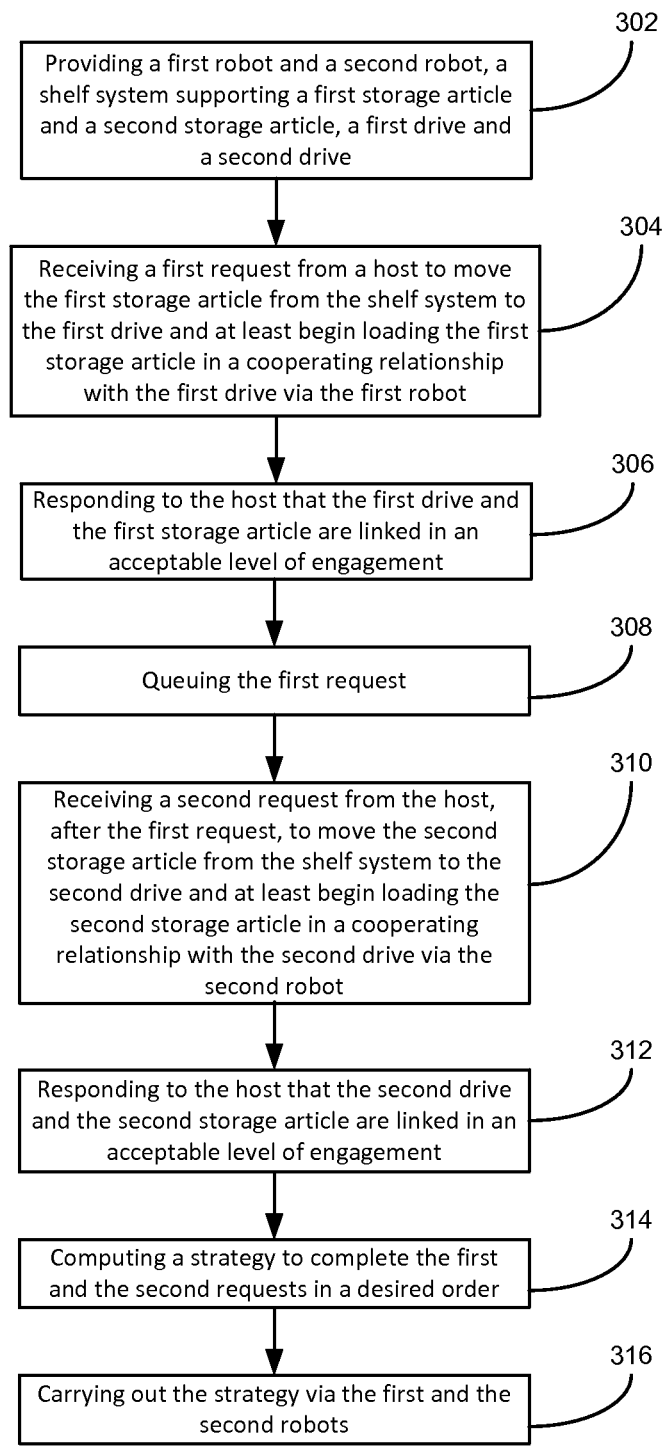
FIG. 3 is a block diagram illustrating a method of practicing an embodiment of the present invention for a storage system with multiple robots.

Referring now to FIG. 3, shown therein is a block diagram illustrating method steps to practice an embodiment of the present invention. It should be recognized that the steps presented in the described embodiments of the present invention do not necessarily require any particular sequence unless otherwise specified explicitly or by alphabetizing or numbering steps. FIG. 1 is used in conjunction with FIG. 3 for purposes of illustration in the present described embodiment. Step 302 is a step for providing a tape library 101 which includes a robot A 114 and a robot B 116, a shelf system 111 that supports at least tape cartridge A 102, tape cartridge B 104, tape cartridge C 106 and tape cartridge D 108, a first drive 118, a second drive 120, a third drive 122, and a fourth drive 124. In step 304, a first request from a host 103 is received by the tape library 101 to move tape cartridge D 108 from the shelf system 111 to the fourth drive 124 and form an acceptable engaging relationship between the tape cartridge D 108 and the fourth drive 214 via robot B 116. In step 306, the host 103 receives a response that the first request has been completed, even though the first request has not physically been carried out. By completed, the fourth tape drive 214 registers that tape cartridge D 108 is in an acceptable engaging relationship, such as when the tape cartridge D 108 has been inserted in the fourth tape drive 214 and is in the process of "becoming ready", for example. In step 308, the first request has been queued, such as by the queue system 126. In step 310, a second request from the host 103 is received, after the first request, to move tape cartridge B 104 from the shelf system 111 to the second drive 120 and form an acceptable engaging relationship between the tape cartridge B 104 and second drive 120 via robot A 114. In step 312, the tape library 101 responds to the host 103 that the second request has been completed, even though, in actuality, the second request has not been physically carried out. A means for receiving and responding to the host 103 can include communication via the communications I/F 130 wherein a means for generating the response can be accomplished by a simple program in the CPU 128 that produces the virtual responses. In step 314, a strategy to complete the first and the second requests in a desired order is computed. A means for computing a strategy can be accomplished by at least one program and processor unit, such as by the CPU 128 and queue system 126. Several means to develop a strategy can be calculations based on optimization of the tape library 101 or inputs from an operator, or combination of both, for example. In step 316, the strategy is carried out via robots A 114 and B 116. A means for carrying out the strategy via the robots A 114 and B 116 can be accomplished by a CAN over which instructions are transmitted by the CPU 128 or the like. A means for faking that a designated tape drive is engaged with a designated tape cartridge to a required level of engagement includes a program or algorithm operated by the CPU 128, or the like, as previously described, that is capable of communicating to a host computer 103 that the designated tape drive and tape cartridge are completed being loaded to at least the minimal level of engagement required by the host computer 103. As previously discussed, the minimal level of engagement may be that the tape cartridge is present in the tape drive or is simply in standby mode ready to receive data or a state there between.

FIGS. 4A and 4B are illustrative of yet another embodiment of the present invention wherein the tape library 101 presents itself to a host computer 103 as possessing a single robotic transport unit. In this embodiment, the tape library 101 masks its true configuration layout after receiving a read element status request from the host computer 103. As previously discussed, a read element status request is sent from the host computer 103 in order to determine the identity and volume of storage elements, the number of drives and their respective logical unit numbers, number of robots, etc. Upon the read element status request, the primary communications I/F 130 transmits to the host computer 103 that the tape library 101 possesses only a single robot, however, in reality, the tape library 101 possesses both robot A 114 and robot B 116. The tape library 101 presents itself as possessing tape cartridges A 102, B 104, C 106 and D 108, first drive 118, second drive 120, third drive 122 and fourth drive 124 all serviced by robot transport unit A 114.

With respect to FIG. 4A, a queue table 200 illustratively shows instructions received from the host computer 103. The first move instruction 410 received from the host computer 103 instructs robot A 114 to move tape cartridge D 108 from the second shelf 112 to the fourth drive 124 to be engaged therewith to a level of satisfaction with the host computer 103. In the present embodiment, the tape library 101 transmits to the host computer 103, via the I/F 130, that the first move instruction 410 is accomplished (to an acceptable level of engagement that satisfies the host computer 103), in a virtual sense, in order to avoid a "downed" drive and avoid any issues that may compromise receiving additional move instructions. The first move instruction 410 is not actually carried out, but rather, remains in queue pending any additional move instructions. In one embodiment, the first move instruction 410 will remain in queue for a predetermined time whereby the move instruction 410 will be carried out after the predetermined time has expired (such as when no additional move instructions are received from the host computer 103 or the drive is in jeopardy of being downed which could take as long as ten to thirty minutes). In another embodiment, the tape library 101 may only allow a certain number of move instructions before disallowing any further instructions. For example, the tape library 101 may only allow eight move instructions to be queued before not allowing any further move instructions until some or all of the eight queued instructions are carried out. Table 400 further illustratively shows a second move instruction 412 whereby robot A 114 is instructed to move tape cartridge B 104 from the first shelf 110 to be engaged with the third drive 122 to an acceptable level of satisfaction with the host computer 103, a third move instruction 414 whereby robot A 114 is instructed to move tape cartridge A 102 from the second shelf 112 to be engaged with the first drive 118 to an acceptable level of satisfaction with the host computer 103, and a fourth move instruction 416 whereby robot A 114 is instructed to move tape cartridge C 106 from the first shelf 110 to be engaged with the second drive 120 to an acceptable level of satisfaction with the host computer 103. There is a fifth row 418 that is available for any future (pending) move instructions.

FIG. 4B illustrates a reorganized table of move instructions 450 that has been adjusted to be physically executed in a preferred order. The asterisk (*) indicates when an instruction or portion of an instruction has been altered from the queue table 400. As illustratively shown in the reorganized table of move instructions 450, the first move instruction 452 was altered to enlist robot B 116 to move tape cartridge D 108 to the fourth drive 108. The second move instruction 454 has been changed from moving tape cartridge B 104 to the second drive 120 instead of the third drive 122. As can be readily seen from FIG. 1, the second drive 120 resides in a more direct path from the first shelf 110 than does the third drive 122. The fourth move instruction 456 has been reordered to occur before the third instruction 458 in order to facilitate the transport of tape cartridge C 106 while tape cartridge B 104 is being moved (from the second move instruction 454). Reordering the fourth move instruction 456 before the third move instruction 458, results in improved efficiency. Furthermore, the fourth instruction 456 has been reordered to move tape cartridge C 106 from the second shelf 112 with robot B 116 to the third drive 122 which is in a more direct path than the original fourth instruction 416 from FIG. 4A. Finally, the third move instruction 458 has been reordered to be carried out last in order to facilitate the transport of tape cartridge A 102 while tape cartridge C 106 is being moved, which, once again, results in improved efficiency.

Figure 5:
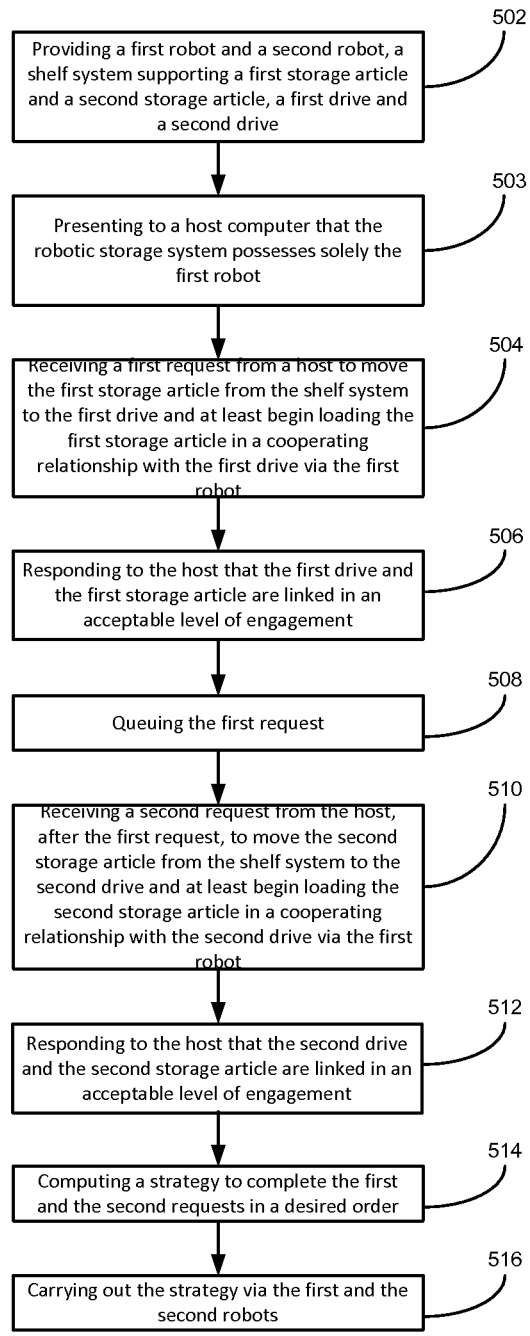
FIG. 5 is a block diagram illustrating a method of practicing an embodiment of the present invention for a storage system with multiple robots identified as possessing a single robot.

Referring now to FIG. 5, shown therein is a block diagram showing method steps to practice an optional embodiment of the present invention wherein the multi-robotic tape library 101 is viewed virtually by the host computer 103 as having only a single robot. It should be recognized that the steps presented in the described embodiments of the present invention do not necessarily require any particular sequence unless otherwise specified explicitly. FIG. 1 is used in conjunction with FIG. 5 for purposes of illustration in this described embodiment. Step 502 is a step for providing a tape library 101 which includes robot A 114 and a robot B 116, a shelf system 111 that supports at least tape cartridge A 102, tape cartridge B 104, tape cartridge C 106 and tape cartridge D 108, a first drive 118, a second drive 120, a third drive 122 and a fourth drive 124. In step 503, the tape library 101 presents itself as possessing solely robot A 114 and not robot B 116 to the host computer 103, therefore receiving all move instructions directed to robot A 114. In step 504, a first request from a host 103 is received by the tape library 101 to move tape cartridge D 108 from the shelf system 111 to the fourth drive 124 and engage tape cartridge D 108 with the fourth drive 214 in a cooperating relationship to an acceptable level of engagement that satisfies the host computer via robot A 114. In step 506, the host 103 receives a response that the first request has been completed (at least to a satisfactory level), even though the first request has not physically been carried out. In step 508, the first request has been queued, such as by the queue system 126. In step 510, a second request from the host 103 is received, after the first request, to move tape cartridge B 104 from the shelf system 111 to the second drive 120 and engage tape cartridge B 104 in an acceptable cooperating relationship with the second drive 120 via robot A 114. In step 512, the tape library 101 responds to the host 103 that the second request has been completed (at least to a satisfactory level), even though, in actuality, the second request has not been physically carried out. A means for receiving and responding to the host 103 can include communication via the communications I/F 130 wherein a means for generating the response can be accomplished by a simple program in the CPU 128 that produces the virtual responses. In step 514, a strategy to complete the first and the second requests in a desired order is computed. In step 516, the strategy is carried out via robots A 114 and B 116 (and respective drives 118, 120, 122 and 124). A means for carrying out the strategy via the robots A 114 and B 116 can be accomplished by a CAN over which instructions are transmitted by the CPU 128 or the like.

A means for computing a strategy can be accomplished by at least one program and processor unit, such as by the CPU 128 and queue system 126. For example, the queue system 126 may be equipped to possess knowledge of where the robots 114 and 116 are located prior to making optimization calculations. In some embodiments, the robot position at the conclusion of an immediately preceding group, or series, of move instructions might be taken as the starting position of the robots 114 and 116 for a next series of move instructions. Optionally, the computer might be able to calculate and to "know in advance" the final position of the robots 114 and 116 prior to finishing a series of move instructions, so that the following series of move instructions can be optimized through computer calculations in order to be seamlessly implemented "on the fly", without pause between series of move instructions. Alternatively, the robots 114 and 116 may be simply returned to a central or other pre-designated position prior to starting a new series of move instructions.

Figure 6:
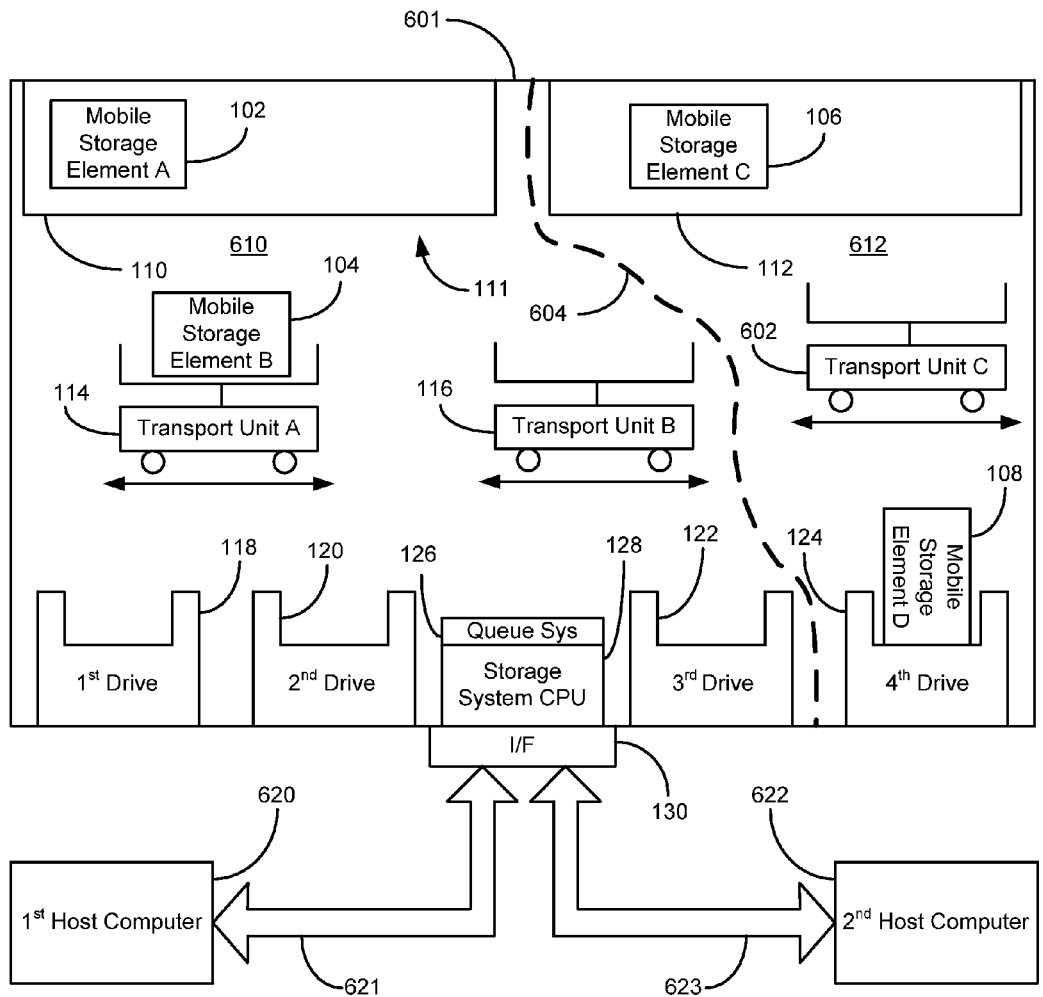
FIG. 6 is a block diagram of a data storage arrangement having multiple partitions constructed in accordance with an embodiment of the present invention.

Once the starting position is known, calculations can be made to determine which sequence is optimal, such as total distance traveled or time of travel. For example, in one embodiment, an algorithm working in conjunction with the queue system 126 can be programmed to calculate the total distance of travel based upon every possible permutation of combinations of tapes moving to drives. Such an algorithm is pre-established, that is established prior to the receiving instructions from the host 803. The distance between each tape and each drive and the possible movements of each robot can be inputted relative to the specific layout of the library 101 either manually or by automated means within the library 101, such as an inventory map, or the like. In the case where there are three tape cartridges in queue to be moved, one robot, and three drives, the computer will calculate 27 move possibilities. The computer may calculate the shortest distance traveled for the robot, the shortest time to complete the moving of all three tape cartridges, or some other designated moving strategy. In an optional embodiment, the algorithm may be set up to choose a specific move instruction if two or more move instructions are calculated to be identical. In yet another optional embodiment, the algorithm may provide for rolling calculations wherein after each move instruction is physically completed, any new move instructions received from the host computer will cause all move instructions in the queue to be recalculated for optimization. FIG. 6 shows an alternative embodiment of the present invention wherein the tape library 601 is configured with partitions 610 and 612. In this embodiment, the CPU 128, or optionally the I/F 130, is capable of directing storage traffic to a specific partition. As illustratively shown, the tape library 101 is divided into a first partition 610 and a second partition 612 by a dashed line 604. Though the dashed line 604 generally indicates an imaginary wall between the partitions 610 and 612, a physical wall or barrier could be contemplated. Each partition 610 and 612 can be allocated tape library resources and storage capacity for a specific client or host, such as the host computer 103, for example. The first partition 610 possesses tape cartridge A 102 and tape cartridge B 104, robotic transport unit A 114 and robot B 116, the first drive 118, the second drive 120 and the third drive 122. The CPU 128 and Queue System 126 serve both the first partition 610 and the second partition 112. The second partition 112 possesses tape cartridge C 106 and tape cartridge D 108, robotic transport unit C 602 and the fourth drive 124. In optional embodiments, the first partition 610 and the second partition 612 can be of equal size. The partitions 610 and 612 can be dedicated to the same host 103, to different hosts or clients, or a combination thereof. As one skilled in the art will appreciate, a library, such as the tape library 101, can be configured with numerous partitioning layouts and schemes. A partition, such as the first partition 610, may be configured by the host 103 or by an operator sending commands through a graphical user interface (not shown) linked to the tape library 101, to name two options.

FIG. 7A illustratively shows a queue table 700 with move instructions for a partitioned tape library 601 that are received from the first host computer 620 and the second host computer 622. FIGS. 7A and 7B are described in conjunction with FIG. 6. Table 700 provides an instruction column 202, a robot transport unit column 204, a storage element column 206, a drive column 208 and a partition column 709. The first move instruction 710 received from the second host computer 622 is directed to the second partition 612, which instructs robot C 602 to move tape cartridge D 108 from the second shelf 112 to the fourth drive 124 whereby an acceptable engaging relationship can be formed therewith. In one embodiment, the tape library 601 transmits to the second host computer 622, via the I/F 130, that the first move instruction 710 is accomplished and the fourth drive 124 and tape cartridge D 108 are engaged within an acceptable level required by the second host computer 622, in a virtual sense, in order to avoid any problems such as a "downed" drive and/or halt to additional move instructions. The first move instruction 710 is not actually carried out, but rather, remains in queue pending any additional move instruction. In one embodiment, the first move instruction 710 will remain in queue for a predetermined time whereby the move instruction 710 will be carried out after the predetermined time has expired (such as when no additional move instructions are received from the second host computer 622 or before an unacceptable amount of time has passed). Table 700 further illustratively shows a second move instruction 412 received by the first host computer 620 directed to the first partition 610 whereby robot A 114 is instructed to move tape cartridge B 104 from the first shelf 110 to the third drive 122 whereby an acceptable engaging relationship can be formed therewith. A third move instruction 714 is recorded as received by the first host computer 620 directed to the first partition 610 whereby robot A 114 is instructed to move tape cartridge A 102 from the second shelf 112 to the first drive 118 whereby an acceptable engaging relationship can be formed therewith. And, a fourth move instruction 716 is received by the second host computer 622 directed to the second partition 612 whereby robot C 602 is instructed to move tape cartridge C 106 from the first shelf 110 to the fourth drive 124 whereby an acceptable engaging relationship can be formed therewith after all the storage related activities associated with the first move instruction 710 are completed. There is a fifth row 718 that is available for any future (pending) move instructions.

FIG. 7B illustrates a reorganized table of move instructions 750 that has been reorganized to be physically executed in a preferred order. The asterisk (*) indicates when an instruction or portion of an instruction has been altered from the queue table 700. As illustratively shown, in the reorganized table of move instructions 750, the first move instruction 710 was not altered, and, as shown in FIG. 6, has been carried out. The second move instruction 752 has been changed from moving tape cartridge B 104 to the second drive 120 instead of the third drive 122. As can be readily seen from FIG. 6, the second drive 120 resides in a more direct path from the first shelf 110 than does the third drive 122. The fourth move instruction 756 has been reordered to occur before the third move instruction 258 in order to stream-line the tape library's operations, in addition to having the fourth drive 124 (from the second partition 612) changed to the second drive 120 (in the first partition 610) for purposes of facilitating the transport of tape cartridge C 106 during storage operations for tape cartridge D 108. In this embodiment, the second host computer 622 is not aware that the second drive 120 is performing storage operations with tape cartridge C 106, nor is the second host computer 622 aware that tape cartridge C 106 is crossing from the native second partition 612 to the first partition 610. Managing storage resources, such as a drive, across multiple partitions can be accomplished by storage procedural algorithms maintained by the CPU 128, or other system that provides adequate processing capability. Finally, the third move instruction 758 has been reordered to be carried out last in order to facilitate the transport of tape cartridge A 102 while tape cartridge C 106 is being moved, which, once again, results in improved efficiency. As is illustratively shown by the reorganization embodiment 750, the tape library 601 has reorganized move instructions from both a first and second host computer 620 and 622 across multiple storage partitions 610 and 612 to optimized storage operations, wherein the move instructions from the first host computer 620 may be received while move instructions are received from the second host computer 622.

Figure 8:
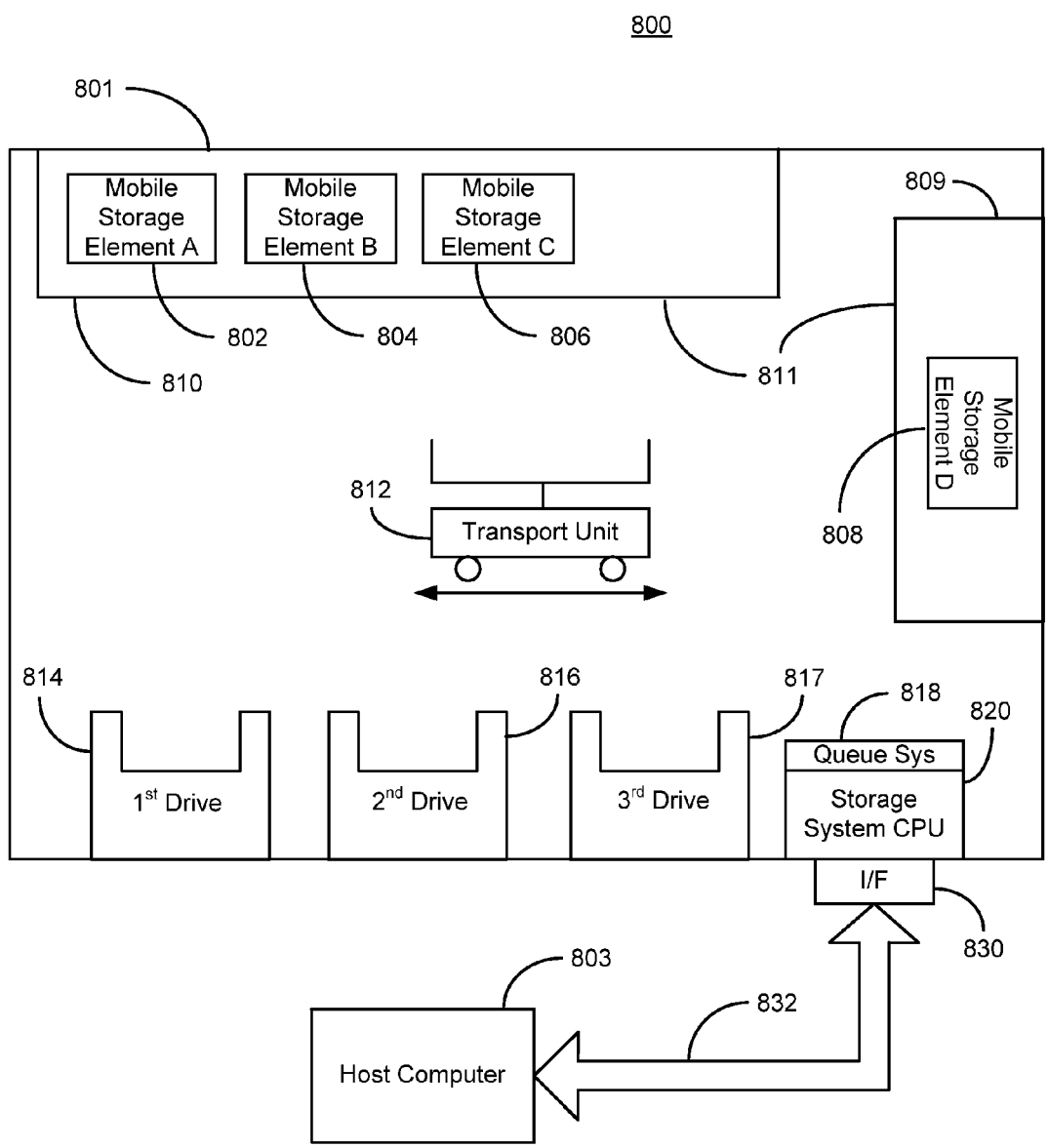
FIG. 8 is a block diagram of a data storage arrangement having a single robot constructed in accordance with an embodiment of the present invention.

FIG. 8 is an illustration of a storage arrangement 800 constructed in accordance with an embodiment of the present invention. The data storage arrangement 800 includes a host computer 803 in communication 832 with a tape library 801 via a primary communication interface processor device (I/F) 830. The tape library 801 is illustratively shown as generally including a shelf system 811 having a first shelf 809 and a second shelf 810, a robotic transport unit 812, four tape cartridges, three drives 814, 816 and 817, a queue system 818, a tape library CPU 820 and I/F 830. As discussed in conjunction with FIG. 1, the block diagram of the tape library 801 shows just the primary elements of interest for purposes of simplicity, as such, certain necessary structures and components for the aforementioned elements to properly function are omitted from the detailed description, however, such integrating structures and components do exist within the scope of the present invention. For example, in practice the tape library 801 includes all of the necessary wiring, user interface panels, plugs, modular components, entry and exit port(s) (to introduce (or remove) tape cartridges into the tape library 801), fault protectors, uninterruptable power supplies, processors, busses, robotic transport unit tracks, indication lights, and so on, in order to function as a data storage library.

As shown in the illustrative embodiment, the shelf system 811 is adapted to support the tape cartridges 802, 804, 806 and 808. Details and embodiments of the shelf system 811 are similar to those discussed in conjunction with FIG. 1. The tape library 801 possesses a robotic transport unit 812 that is available for transporting a magazine. The robot 812 possesses features consistent with the robots 114 and 116 discussed in more detail in conjunction with FIG. 1. In this embodiment, the robot 812 is enabled to move between the shelf 811 and the first drive 814, the second drive 816 and the third drive 817. Though the tape library 801 illustratively shows three drives 814, 816 and 817, in optional embodiments, the library 801 may possess more drives or fewer drives.

Communication protocol is bridged between the host computer 803 and the tape library 801 via the I/F 830. With respect to FIG. 8, the I/F 830 is linked to the CPU 820, along with most electrical components within the tape library 801 via a CAN (not shown) specific to the tape library 801. The I/F 830 is illustratively shown in communication via the two way arrow 832 with the host computer 803. Upon the read element status request, in this embodiment, the primary communications I/F 830 transmits to the host computer 803 that the tape library 801 possesses the elements and components as shown in FIG. 8. Optionally, the tape library 801 may transmit to the host computer 803 that multiple robots exist in addition to the potential of more drives in response to the read element status request initiated by the host computer 803.

Move instructions will generally include instructions to move a tape cartridge from the shelf system 811 to a designated drive via the robot 812. The robot 812 will then deliver the tape cartridge to the designated drive in order for the tape cartridge to engage the designated drive to form a cooperative read and write relationship. As previously discussed, after sending the first move instruction, the host computer 803 "pings" the designated drive to make sure that the drive and tape are engaged in a relationship that is acceptable for the designated drive to avoid being considered "downed", since a "downed" drive is taken off-line. In some circumstances, the robot 812 will may remain substantially in standby if the designated drive responds to the host computer 803 as empty or not engaged with the tape cartridge in an acceptable way. Once the designated drive is "pinged" and reports that an acceptable engagement between the tape cartridge and drive has occurred, the host computer 803 may, in some instances, then send a second move instruction for a second tape cartridge to be moved to a second drive via the robot 812. In other instances, the host computer 803 may identify the tape library 801 as possessing multiple robots (even though there is only one robot 812) and send multiple move instructions corresponding to each virtual robot. In this scenario, the host computer 803 may be prompted to send multiple move commands believing that multiple robots will carry out the multiple move commands. In this instance, the host computer 803 may await to receive confirmation that each move instruction has been carried out by each virtual robot and each designated tape drive whereby the designated tape drive is expected to respond that a respective tape cartridge is engaged in an acceptable manner. In one embodiment of the present invention, each move instruction is held in queue and not physically carried out, however, the tape library 801 responds to the host computer 803 that each instruction to move has been accomplished and each designated drive is engaged with a designated tape cartridge at an acceptable level of engagement, in a virtual sense. The tape library 801 is then free to physically carry out each instruction in a preferred order.

The queue can be a simple table of move instructions that are reorganized in a preferred order by queue system 818 and an associated algorithm. The queue system 818 can be an integrated function within the tape library's CPU 820 or a standalone device providing sufficient memory to maintain a table of instructions and an ordering algorithm that is executed with the appropriate processors that can receive, manage and perform the queuing duties. The move instructions can be saved in non-volatile memory, thus providing a record of the instructions even after the tape library 801 is re-energized following power loss, whether expected or unexpected, before the move instructions have been fully executed.

FIG. 9A is a queue table 900 that illustratively shows instructions received from the host computer 803 wherein the tape library 801 is identified as a having the single robot 812. FIGS. 9A and 9B are an example of reorganizing move instructions for the tape library 801 from FIG. 8. Table 900 provides an instruction column 902, a storage element column 904 and a drive column 906. The first move instruction 910 received from the host computer 803 instructs the robot 812 to move tape cartridge D 808 from the first shelf 809 to the first drive 814 to be engaged therewith. As previously discussed, in one embodiment, the tape library 801 transmits to the host computer 803, via the I/F 830, that the first move instruction 910 and tape cartridge/drive engagement is acceptably accomplished, in a virtual sense, in order to receive additional move instructions. The first move instruction 910 is not actually carried out, but rather, remains in queue pending any additional move instruction. In one embodiment, the first move instruction 910 will remain in queue for a predetermined time whereby the move instruction 910 will be carried out after the predetermined time has expired (such as when no additional move instructions are received from the host computer 803). Table 900 further illustratively shows a second move instruction 912 whereby the robot 812 is instructed to move tape cartridge B 804 from the second shelf 810 to be engaged with the second drive 816, a third move instruction 914 whereby the robot 812 is instructed to move tape cartridge A 802 from the second shelf 810 to be engaged with the third drive 817, and a fourth move instruction 916 whereby the robot 812 is instructed to move tape cartridge C 806 from the second shelf 810 to be engaged with the second drive 816. There is a fifth row 918 that is available for any future (pending) move instructions.

FIG. 9B illustrates a reorganized table of move instructions 950 that has been adjusted to be physically executed in a preferred order. The asterisk (*) indicates when an instruction or portion of an instruction has been altered from the queue table 900. As illustratively shown in the reorganized table of move instructions 950, the first move instruction 952 was altered from moving tape cartridge D 808 to the first drive 814 to moving tape cartridge D 808 to the third drive 817, which, as can be readily seen, is a more efficient transport move. The fourth move instruction 954 has been reordered to occur before the third move instruction 956 and the second move instruction 958 because it is more efficient to move tape cartridge C 806 before moving tape cartridge B 804 (disregarding any priority instruction for tape cartridge B 804 over any other tape cartridge). The third move instruction 956 was altered from moving tape cartridge A 802 in the third drive 817 to the first drive 814, which, as can be readily seen, is a more efficient transport move. The second move instruction 958 has been reordered to occur last because all other drives are in use. As illustratively shown, the drive for the second move instruction 958 has not been assigned, but is rather pending the first available drive to improve efficiency. In an optional embodiment, the second move instruction 958 can retain the originally assigned drive (the second drive 816). Alternatively, the second move instruction 958 can be assigned a different drive based on the shortest distance from tape cartridge location relative to a drive instead of being in an unassigned state pending a first available drive. In yet another optional embodiment, the tape library 801 may receive other move instructions and reorganize the second move instruction 958 yet again with the overall efficiency of the additional move instructions in mind.

Figure 10:
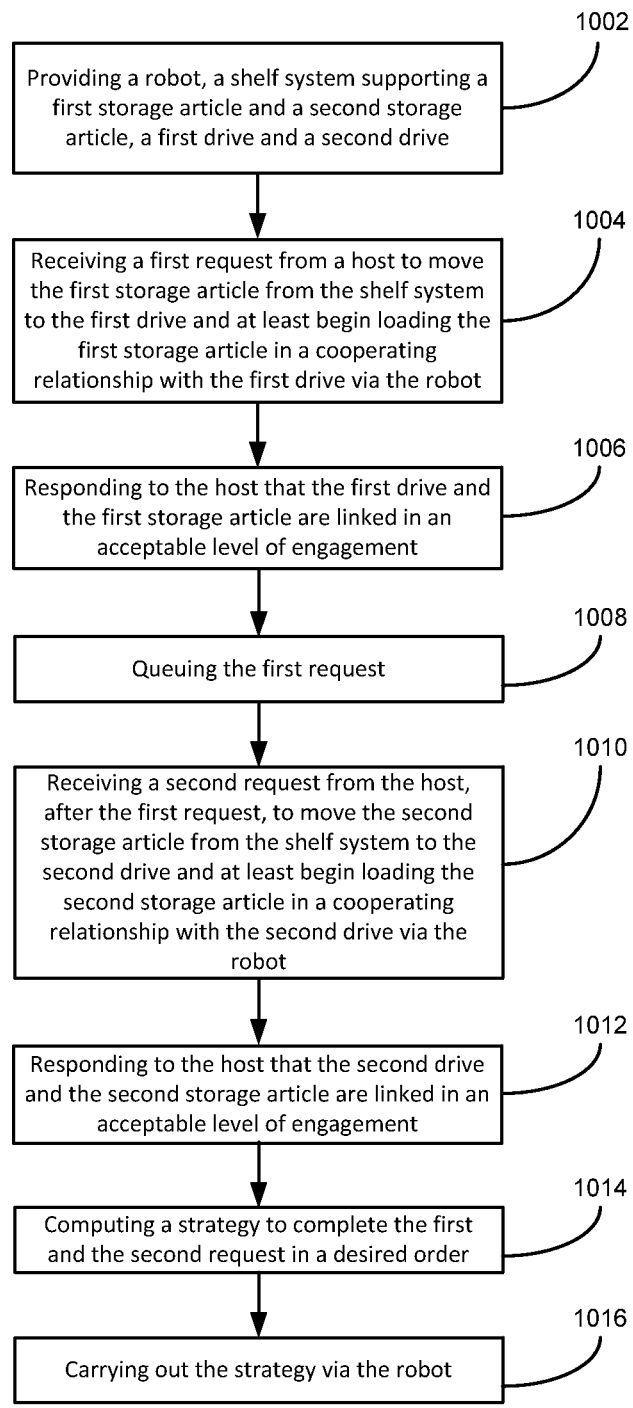
FIG. 10 is a block diagram illustrating a method of practicing an embodiment of the present invention for a storage system with a single robot identified as possessing a single robot.

Referring now to FIG. 10, shown therein is a block diagram showing method steps to practice an embodiment of the present invention. It should be recognized that the steps presented in the described embodiments of the present invention do not necessarily require any particular sequence unless otherwise specified explicitly. FIG. 8 is used in conjunction with FIG. 10 for purposes of illustration in this described embodiment. Step 1002 is a step for providing a tape library 801 which includes a robot 812, a shelf system 811 that supports at least tape cartridge A 802, tape cartridge B 804, tape cartridge C 806 and tape cartridge D 808, a first drive 814, a second drive 816 and a third drive 817. In step 1004, a first request from a host 803 is received by the tape library 801 to move tape cartridge D 808 from the shelf system 811 to the first drive 814 and load tape cartridge D 808 in an acceptable engaging relationship with the first drive 814 via the robot 812. In step 1006, the host 803 receives a response that the first request has been completed to an acceptable level, even though the first request has not physically been carried out. In step 1008, the first request has been queued, such as by the queue system 818. In step 1010, a second request from the host 803 is received (after the first request) to move tape cartridge B 804 from the shelf system 811 to the second drive 816 and load tape cartridge B 804 in an acceptable engaging relationship with the second drive 816 via the robot 812. In step 1012, the tape library 801 responds to the host 803 that the second request has been completed, even though, in actuality, the second request has not been physically carried out. A means for receiving and responding to the host 803 can include communication via the communications I/F 830 wherein a means for generating the response can be accomplished by a simple program in the CPU 820 that produces the virtual responses (or other device with the appropriate capability, i.e., processors and memory, etc.). In step 1014, a strategy to complete the first and the second requests in a desired order is computed. A means for computing a strategy can be accomplished by at least one program and processor unit, such as by the CPU 820 and queue system 818, or the like. Several means to develop a strategy can be calculations based on optimization of the tape library 801, inputs from an operator, priority of information on a mobile storage device, just to name several for example. In step 1016, the strategy is carried out via the robot 812. A means for carrying out the strategy via the robot 812 can be accomplished by a CAN over which instructions are transmitted by the CPU 820 or the like. In one embodiment, the steps are performed in the order as enumerated in FIG. 10.

FIGS. 11A and 11B illustrate a queue table 1100 and reorganization table 0, respectively, of an embodiment of the present invention wherein the tape library 801, of FIG. 8, presents itself to the host computer 803 as possessing multiple robot units when, in actuality, the tape library only has a single robot 812. FIGS. 11A and 11B are illustratively shown with reference to FIG. 8. FIGS. 11A and 11B are an example of reorganizing move instructions for the tape library 801 from FIG. 8 in accordance with the present embodiment. This embodiment illustrates an alternate way to trick the host computer 803 into sending multiple move instructions to the library 801 whereby the multiple move instructions can be queued and executed in a desired order such as by an optimization calculation.

FIG. 11A is a queue table 1100 that illustratively shows instructions received from the host computer 803 wherein the tape library 801 is identified as a having at least a first robot and a second robot (in the virtual sense). Table 1100 provides an instruction column 1102, robot column 1104 wherein a first or second robot can be selected, a storage element column 1106 and a drive column 1108. The first move instruction 1110 received from the host computer 803 instructs the first robot to move tape cartridge D 808 from the first shelf 809 to the first drive 814 to be acceptably engaged therewith. In one embodiment, the tape library 801 transmits to the host computer 803, via the I/F 830, that the first move instruction 1110 is in process via the first robot and the second robot is available to carry out move instructions immediately. In an optional embodiment, the host computer 803 will simply issue two move instructions directed to the first and second robots. In yet another alternative embodiment, the tape library 801 transmits to the host computer 803, via the I/F 830, that the first move instruction 1110 is accomplished and the designated first drive 814 is acceptably engaged with tape cartridge D 808, in a virtual sense, such as, for example to receive additional move instructions for either the first or second robot. The first move instruction 1110 is not actually carried out, but rather, remains in queue pending any additional move instruction. In one embodiment, the first move instruction 1110 will remain in queue for a predetermined time whereby the move instruction 1110 will be carried out after the predetermined time has expired (such as when no additional move instructions are received from the host computer 803). Table 1100 further illustratively shows a second move instruction 1112 whereby the second robot is instructed to move tape cartridge B 804 from the second shelf 810 to be engaged with the second drive 816, a third move instruction 1114 whereby the second robot is instructed to move tape cartridge A 802 from the second shelf 810 to be engaged with the third drive 817, and a fourth move instruction 1116 whereby the first robot is instructed to move tape cartridge C 806 from the second shelf 810 to be engaged with the second drive 816. There is a fifth row 1118 that is available for any future (pending) move instructions.

FIG. 11B illustrates a reorganized table of move instructions 0 that has been adjusted to be physically executed in a preferred order. The asterisk (*) indicates when an instruction or portion of an instruction has been altered from the queue table 1100. Because the tape library 801 only possesses a single robot 812, all of the instructions selecting the first and second robots have been reassigned to the single robot 812 as indicated by the "1*" in column 1104 of table 0. As illustratively shown in the reorganized table of move instructions 0, the first move instruction 2 was altered from moving tape cartridge D 808 to the first drive 814 to moving tape cartridge D 808 to the third drive 817, which, as can be readily seen, is a more efficient transport move. The fourth move instruction 4 has been reordered to occur before the third move instruction 6 and the second move instruction 8 because it is more efficient to move tape cartridge C 806 before moving tape cartridge B 804 (disregarding any priority instruction for tape cartridge B 804 over any other tape cartridge). The third move instruction 6 was altered from moving tape cartridge A 802 in the third drive 817 to the first drive 814, which, as can be readily seen, is a more efficient transport move. The second move instruction 8 has been reordered to occur last because all other drives are in use. As illustratively shown, the drive for the second move instruction 8 has not been assigned, but is rather pending the first available drive to improve efficiency. In an optional embodiment, the second move instruction 8 can retain the originally assigned drive (the second drive 816). Alternatively, the second move instruction 8 can be assigned a different drive based on the shortest distance from tape cartridge location relative to a drive instead of being in an unassigned state pending a first available drive. In yet another optional embodiment, the tape library 801 may receive other move instructions and reorganize the second move instruction 8 yet again with the overall efficiency of the additional move instructions in mind.

Figure 12:
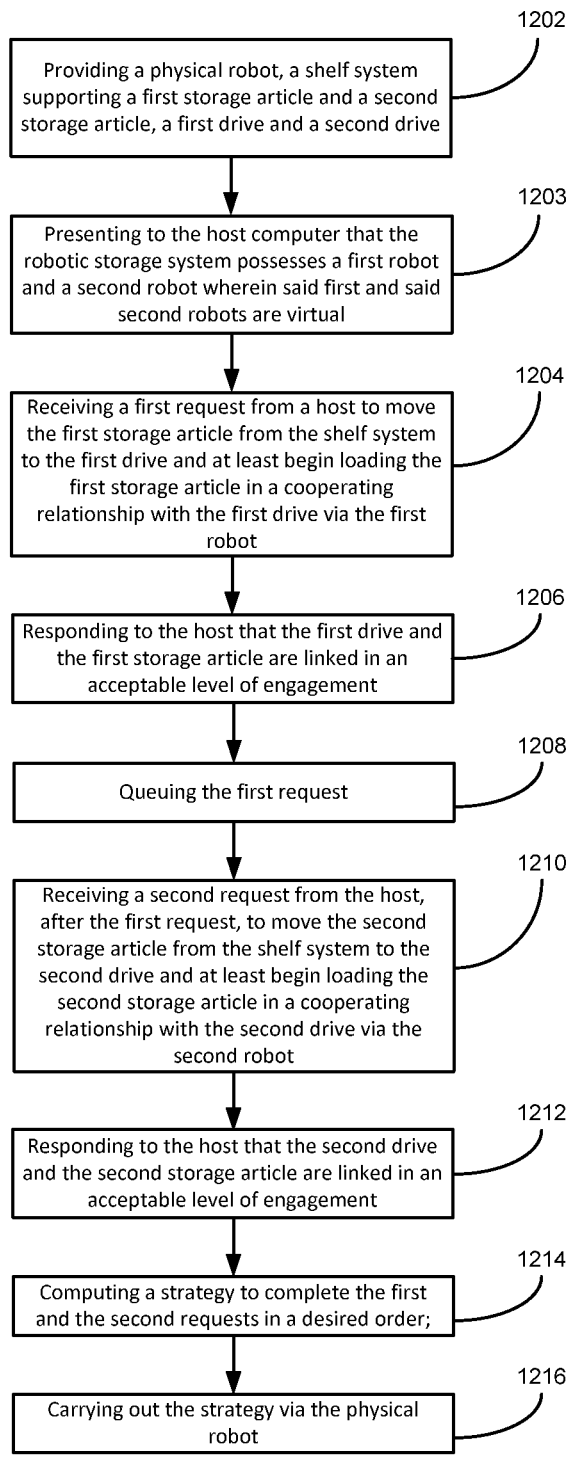
FIG. 12 is a block diagram illustrating a method of practicing an embodiment of the present invention for a storage system with a single robot identified as possessing multiple robots.

Referring now to FIG. 12, shown therein is a block diagram showing method steps to practice an embodiment of the present invention. It should be recognized that the steps presented in the described embodiments of the present invention do not necessarily require any particular sequence unless otherwise specified explicitly. FIG. 12 is used in conjunction with FIG. 8 for purposes of illustration in this described embodiment. Step 1202 is a step for providing a tape library 801 which includes a robot 812, a shelf system 811 that supports at least tape cartridge A 802, tape cartridge B 804, tape cartridge C 806 and tape cartridge D 808, a first drive 814, a second drive 816 and a third drive 817. In step 1203, the tape library 801 presents itself to a host computer 803 as possessing a first robot and a second robot wherein the first and second robots are virtual devices (in actuality, there is only one robot 812). In step 1204, a first instruction from the host 803 to move tape cartridge D 808 from the shelf system 811 to the first drive 814 and load tape cartridge D 808 in an engaging relationship with the first drive 814 via the first robot is received by the tape library 801. In step 1206, the host 803 receives a response that the first move instruction has been completed and the first drive 814 is in an acceptable engaging relationship with tape cartridge D 808, even though the first instruction has not physically been carried out. In step 1208, the first instruction has been queued, such as by the queue system 818. In step 1210, a second instruction from the host 803 is received (after the first instruction) to move tape cartridge B 804 from the shelf system 811 to the second drive 816 and load tape cartridge B 804 in an engaging relationship with the second drive 816 via the second robot. In step 1212, the tape library 801 responds to the host 803 that the second move instruction has been completed and tape cartridge B 804 is in an acceptable engaged relationship with the second drive 816, even though, in actuality, the second move instruction has not been physically carried out. A means for receiving and responding to the host 803 can include communication via the communications I/F 830 wherein a means for generating the response can be accomplished by a simple program in the CPU 820 that produces the virtual responses (or other device with the appropriate capability, i.e., processors and memory, etc.). In step 1014, a strategy to complete the first and the second instructions in a desired order is computed. A means for computing a strategy can be accomplished by at least one program and processor unit, such as by the CPU 820 and queue system 818, or the like. Several means to develop a strategy can be calculations based on optimization of the tape library 801, inputs from an operator, priority of information on a mobile storage device, just to name several for example. In step 1216, the strategy is carried out via the physical robot 812. A means for carrying out the strategy via the robot 812 can be accomplished by a CAN over which instructions are transmitted by the CPU 820 or the like. In one embodiment, the steps are performed in the order as enumerated in FIG. 12.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the embodiments generally describe a desired order to mean a most efficient manner for moving storage elements within a library, however, desired order is not limited to efficiency, there may be priority customers, priority data, or some other order that is customized for a specific user of data. Furthermore, the queue system may have multiple different desired orders that are executed in a particular order or randomly, for example, without departing from the scope and spirit of the present invention. It is to be further understood that in some embodiments of the present invention, the designated drives may be unalterable because the host computer, such as host 103, may be in communication with each of the actual drives whereby no substitute address for a given drive is presented to the host computer. Thus, in this example, the order of the commands may be changed, for example, but the drives associated with the given commands remain as designated by the host computer. Finally, although the preferred embodiments described herein are directed to tape cartridges, it will be appreciated by those skilled in the art that the teachings of the present invention can be applied to other storage means such as tape magazines, disc drive systems, such as the disc drive magazines, and related technology, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A robotic storage system comprising:
   a first and a second robot;
   a first and a second mobile storage element;
   a shelf system wherein said first and said second mobile storage elements can be disposed;
   a first and a second drive adapted to be loaded with either of said mobile storage elements in an engaging relationship whereby storage related operation can occur;
   a queue system containing a first and a second move instruction received from a host wherein said first move instruction includes commands to move said first mobile storage element from said shelf system to said first drive and load said first mobile storage element into said first drive via said first robot, said first robot identified by the host, and said second move instruction includes commands to move said second mobile storage element from said shelf system to said second drive and load said second mobile storage element into said second drive via said first robot;
   a communication interface that affirms to said host that said first move instruction is completed via a first move response, that said first drive is engaged at a minimum acceptable level with said first mobile storage element via a first load response, that said second move instruction is completed via a second move response, that said second drive is engaged at said minimum acceptable level with said second mobile storage element via a second load response wherein all of said responses are made prior to actual execution of any of said responses; and
   an algorithm operatively regulating said queue system to reorganize said first and said second move instructions in said storage system in a preferred order and cause said first and said second robot to physically execute said instructions in said preferred order.

2. The robotic storage system of claim 1 wherein said preferred order is to complete said second move instruction before completing said first move instruction.

3. The robotic storage system of claim 1 wherein said preferred order is to complete said second move instruction via said first robot and said first move instruction via said second robot.

4. The robotic storage system of claim 1 further comprising a means for retaining said first and said second move instructions in said queue system after said robotic storage system is re-energized following an unexpected loss of power before said move instructions have been fully executed.

5. The robotic storage system of claim 1 wherein said queue system includes a table of said instructions maintained by memory disposed within said storage system.

6. The robotic storage system of claim 1 further comprising:
   a third mobile storage element disposed in said shelf system and a third drive;
   a first partition and a second partition wherein said first and said second drives are associated with said first partition and said third drive is associated with second partition;
   a third move instruction from a second host retained in said queue system wherein said third move instruction includes commands to move said third mobile storage element from said shelf system to said third drive and load said third mobile storage element into said third drive via said first robot, and wherein said third move instruction is affirmed to said second host as executed via a third move response and that said third drive is engaged at a minimum acceptable level with said third mobile storage element via a third load response via said communication interface; and
   said algorithm further capable of organizing said third instruction with said first and said second instructions in said preferred order.

7. The robotic storage system of claim 1 wherein said first and said second mobile storage element are selected from a group of mobile storage elements consisting of: a tape cartridge magazine, a mobile disc drive magazine, a solid state memory adapted for mobility, and a disc drive adapted for mobility.

8. The robotic storage system of claim 1 wherein said minimum acceptable level of engagement is when said first or said second mobile storage element is linked with said first or said second drive, respectively, prior to being ready to perform storage related operations.

9. The robotic storage system of claim 1 wherein said minimum acceptable level of engagement is when said first or said second mobile storage element is linked with said first or said second drive, respectively, and ready to perform storage related operations.

10. The robotic storage system of claim 1 wherein said first and said second mobile storage elements are a tape cartridge and said robotic storage system is a tape library.

11. The robotic storage system of claim 1 wherein said preferred order is based at least partly on efficiency of travel of said robots between said mobile storage elements and said drives.

12. The robotic storage system of claim 11 wherein said efficiency consists essentially of time of travel.

13. The robotic storage system of claim 11 wherein said efficiency consists essentially of distance of travel.

14. The robotic storage system of claim 1 wherein said preferred order is based at least partly on an urgency to obtain information from at least one mobile storage element.

15. The robotic storage system of claim 1 wherein said preferred order is based at least partly on a priority of customer or other entity associated with information on at least one mobile storage element.

16. The robotic storage system of claim 1 wherein said algorithm organizes said instructions a predetermined amount of time after said queue system receives said first move instruction from said host.

17. The robotic storage system of claim 1 wherein said algorithm organizes said instructions after receiving a predetermined number of move instructions from said host.

18. The robotic storage system of claim 1 wherein said algorithm organizes said instructions upon either (a) a predetermined amount of time after said queue system receives said first move instruction from said host or (b) after receiving a predetermined number of move instructions from said host, whichever occurs earlier.

19. A method for executing instructions in a robotic storage system comprising:
providing a first robot and a second robot, a shelf system supporting a first storage element and a second storage element, a first drive and a second drive;
receiving a first request from a host to move said first storage element from said shelf system to said first drive and load said first storage element in a cooperating relationship with said first drive via said first robot, wherein said host identifies said first robot;
responding to said host that said first storage element has been moved to said first drive and that said first storage element is engaged at said minimum acceptable level with said first storage drive;
queuing said first request;
receiving a second request from said host, after said first request, to move said second storage element from said shelf system to said second drive and load said second storage element in a cooperating relationship with said second drive via said first robot;
responding to said host that said second storage element has been moved to said second drive and that said second storage element is engaged at said minimum acceptable level with said second drive;
computing a strategy that reorganizes said first and said second requests in a desired order; and
carrying out said strategy via said first and said second robots.

20. The method of claim 19 further comprising queuing said second request.

21. The method of claim 20 further comprising:
providing a third storage element, a third robot and a third drive;
receiving a third request from said host to move said third storage element from said shelf system to said third drive and load said third storage element in a cooperating relationship with said third drive via said first robot;
responding to said host that said third storage element has been moved to said third drive and that said third storage element is engaged at said minimum acceptable level with said third storage drive;
queuing said third request;
computing said strategy to include said third request; and
carrying out said strategy via said first, said second and said third robots.

22. The method of claim 20 further comprising:
providing a third storage element, a third robot and a third drive;
receiving a third request from a second host to move said third storage element from said shelf system to said third drive and load said third storage element in a cooperating relationship with said third drive via said first robot;
responding to said second host that said third storage element has been moved to said third drive and that said third storage element is engaged at said minimum acceptable level with said third storage element;;
queuing said third request;
computing said strategy to include said third request; and
carrying out said strategy via said first, said second and said third robots.

23. The method of claim 19 wherein said desired order is for said second robot to move said first storage element and said first robot to move said second storage element.

24. The method of claim 19 wherein said first robot carries out said strategy while said second robot is carrying out said strategy.

25. A robotic storage system comprising:
a queue system containing a first move instruction received from a host and a second move instruction received from said host wherein said first move instruction commands said first robot to move a first mobile storage element from a shelf system to a first drive, said first robot identified by said host, and load said first mobile storage element into said first drive, and said second move instruction commands said first robot to move a second mobile storage element from said shelf system to a second drive and load said second mobile storage element into said second drive, said second move instruction received by a host after said storage system makes known to said host that said first mobile storage element has been moved to said first drive and that said first mobile storage element is engaged at a minimum acceptable level with said first drive, prior to actually physically completing said first move instruction;
a means for reorganizing said first and said second move instructions in said storage system in a preferred order via said queue system and wherein said first robot and said second robot physically carry out said first and said second move instructions based on said preferred order.

26. A method for use in a robotic storage library, the method comprising:
a) receiving a first move instruction from a host computer directing a first robot to move a first storage element from a shelf to a first drive, wherein said host has knowledge of said first robot;
b) in reference to said first move instruction, responding to said host that said first drive is in possession of said first storage element in a minimal acceptable engaged relationship in anticipation of a second move instruction regardless of whether, in actuality, said first drive possesses said first storage element;
c) receiving a second move instruction from said host computer directing a second robot to move a second storage element from said shelf to said first drive;
d) in reference to said second move instruction, responding to said host that said second drive is in possession of said second storage element in a minimal acceptable engaged relationship regardless of whether, in actuality, said second drive possesses said second storage element;

e) queuing said first and said second move instructions;
f) reorganizing said first and said second move instructions in a preferred order; and
g) carrying out said preferred order via said first and said second robots within said robotic storage library.

27. A robotic storage library including:
a plurality of mobile storage elements;
a plurality of robots;
at least one drive adapted to receive one of said mobile storage elements in an at least minimally acceptable operative engagement;
a queue system that is adapted to receive a plurality of move instructions from a host computer, each of said move instructions to move one of said storage elements via only one of said robots to said at least one drive for operative engagement therewith, wherein said one robot is targeted by said host computer, to initially organize said instructions in an order essentially as chronologically received, and to reorganize said instructions according to a pre-established algorithm that includes at least two of said plurality of robots.

\* \* \* \* \*